United States Patent [19]
Rennie et al.

[11] Patent Number: 5,907,006
[45] Date of Patent: May 25, 1999

[54] COMPOSITIONS FOR THE COATING OF SUBSTRATES OF MATT APPEARANCE

[76] Inventors: Stephen Rennie, Abbots House, Church Street, Winslow Bucks MK 18 3AN, United Kingdom; Arnaud Tedoldi, 13, rue du Tilleul, Le Tilleul-Dame-Agnes, 27170, Beaumont-le Roger; Didier Juhue, 35 Rue Gaston Follope, 27300, Bernay, both of France

[21] Appl. No.: 08/750,067

[22] PCT Filed: Jun. 6, 1995

[86] PCT No.: PCT/FR95/00732

§ 371 Date: Feb. 7, 1997

§ 102(e) Date: Feb. 7, 1997

[87] PCT Pub. No.: WO95/33796

PCT Pub. Date: Dec. 14, 1995

[30] Foreign Application Priority Data

Jun. 3, 1994 [GB] United Kingdom .................... 9411101

[51] Int. Cl.[6] .............................. C08K 5/20; C08K 5/36; C08K 5/48
[52] U.S. Cl. .......................... 524/223; 428/386; 428/387; 428/388; 428/389; 524/159; 524/169; 524/413; 524/904
[58] Field of Search ..................... 428/367, 368, 428/387, 388, 386, 389, 394, 395; 523/300, 442, 443, 513, 515; 524/223, 226, 159, 169, 424, 413, 904

[56] References Cited

U.S. PATENT DOCUMENTS

| | | | |
|---|---|---|---|
| 3,485,789 | 12/1969 | Guilbault | 524/904 |
| 3,842,035 | 10/1974 | Klaren | 524/904 |
| 4,387,188 | 6/1983 | Statz | 524/424 |
| 4,530,952 | 7/1985 | Tayama et al. | 524/226 |
| 4,663,375 | 5/1987 | Tamura | 524/226 |
| 4,927,710 | 5/1990 | Tanaka . | |
| 4,943,606 | 7/1990 | Inoue et al. | 524/424 |
| 5,043,118 | 8/1991 | Kim et al. | 524/424 |
| 5,112,899 | 5/1992 | Yamaya et al. | 524/413 |
| 5,137,941 | 8/1992 | Oshima | 524/413 |
| 5,276,080 | 1/1994 | Oku | 524/424 |
| 5,373,046 | 12/1994 | Okamura et al. | 524/413 |
| 5,434,210 | 7/1995 | Rangaswamy et al. | 524/413 |
| 5,563,199 | 10/1996 | Harada et al. | 524/413 |
| 5,610,219 | 3/1997 | Takatani et al. | 524/413 |

FOREIGN PATENT DOCUMENTS 2204674  5/1974  France .

*Primary Examiner*—Veronica P. Hoke
*Attorney, Agent, or Firm*—Bell, Boyd & Lloyd

[57] ABSTRACT

The invention relates to compositions for the coating of substrates of matt surface appearance, based on thermoplastic and/or heat-curable resins such as PA, PP, polyesters and epoxy resins and containing one or a number of matting agents which are predominantly in the form of terephthalic acid dianilide or its substituted derivatives needles or flakes of average length of between 1 and 200 μm and of aspect ratio of between 10 and 40.

These compositions, generally in the form of powders, are employed for coating various substrates. The coatings are applied especially by dipping in a fluidized bed or by electrostatic spraying. The coated articles may be components of furnishing, of decoration or of construction.

19 Claims, No Drawings

COMPOSITIONS FOR THE COATING OF SUBSTRATES OF MATT APPEARANCE

TECHNICAL FIELD

The present invention relates to compositions for the coating of substrates of matt surface appearance.

PRIOR ART

Coatings for substrates based on polymers, for example based on polyamide (PA), polyester or epoxy resins are widely employed for coating metal substrates. However, such coatings generally exhibit some gloss which it is sometimes desirable to avoid, for example for covering some motor vehicle parts (bumpers, etc.) and in the case of some components of decorative furniture and construction in the fields of interior decoration, of furnishing and of building.

To impart mattness to polymer-based compositions it has been proposed to incorporate into the resins inorganic substances or fillers such as calcium carbonate, silica or talc. To obtain coating whose 60° specular gloss is 30%, the quantity of fillers is higher than 40% by weight and the composition then undergoes a significant decrease in its mechanical properties; it is impossible to obtain even greater mattness without causing unacceptable detriment to the other properties of the coatings.

It has also been proposed to add to these compositions either resins such as a cyclic amidine, polycarboxylic acid or an ionomer resin, or thermoplastic resins such as polyolefins; here too, however, the degree of mattness is insufficient and the mechanical properties are impaired, as is the thermal stability of the coating (yellowing).

DESCRIPTION OF THE INVENTION

The invention relates to compositions based on resins for the coating of substrates of matt surface appearance and whose mechanical properties are similar to those of unfilled compositions. The degree of mattness of a surface is assessed by measuring specular gloss, that is to say the ratio of the intensity of radiation reflected by this surface to the incident radiation applied. A surface will be considered to be "matt" if, with an incident radiation forming an angle of 60° with the said surface, the reflected radiation/incident radiation ratio is lower than or equal to 30%.

The resins or polymers of the coating compositions may be thermoplastic resins or heat-curable resins.

By way of example of thermoplastic resins there may be mentioned
  polyolefins such as PE, PP, their copolymers or alloys
  PVC
  aliphatic, cycloaliphatic and/or aromatic polyamides such as PA-11, PA-12, PA-12,12, PA-6, PA-6,6, PA-6,12 and polyamide-based thermoplastic elastomers, by themselves, mixed and/or copolymerized.

By way of example of heat-curable resins there may be mentioned
  epoxy and epoxy/phenolic resins,
  polyester resins,
  epoxy/polyester hybrids.

Acrylic and polyurethane resins which are also suitable can be either thermoplastic or heat-curable, like some polyester resins.

Polyesters are intended to mean the resins originating from the condensation reactions between mono- and polyfunctional acids with anhydrides, polyols or esters.

Epoxy resins are intended to mean the products originating from the chemistry of bisphenol A diglycidyl ether, also called BADGE and the products originating from the chemistry of the glycidyl ether of novolac resins. The BADGE resins employed have molecular masses which are generally between 600 and 6000 g/mol.

The coating compositions according to the invention may contain one or more of the resins listed above.

The coating compositions according to the invention may contain various additives and/or fillers, such as pigments or colorants, and antipitting, reducing and antioxidant agents and the like and reinforcing fillers:

antioxidants such as copper iodide combined with potassium iodide, phenol derivatives and hindered amines,
  plasticizing agents,
  reinforcing and nucleating fillers such as Dolomie®, calcium and/or magnesium carbonate, quartz, boron nitride, the kaolin sold under the trade name "Frantex®", wollastonite, titanium dioxide, ballotini, talc, mica, which are sold under the names "Dolomie®" (calcium magnesium double carbonate), "Plastorite" (mixture of quartz, mica and chlorite), "Minex®" (calcium carbonate), and carbon black,
  UV stabilizers like, for example, resorcinol derivatives, benzotriazoles or salicylates,
  antipitting agents or spreading agents,
  pigments like, for example, titanium dioxide, carbon black, cobalt oxide, nickel titanate, molybdenum disulphide, aluminium flakes, iron oxide, zinc oxide and organic pigments like phthalocyanine and anthraquinone derivatives.

It is possible to incorporate into the compositions of the invention additives chosen especially from those described above and whose respective proportions remain within the limits usually encountered in the field of the powder compositions for the coating of substrates, especially metallic ones. In general, up to 100% by weight of the said constituents is incorporated, that is to say that these fillers may represent the same weight as the quantity of resin(s).

These additives may be incorporated into the compositions of the invention by any means. The above compositions may be obtained in a known manner by any technique for mixing the constituents in the molten state, such as, for example, extrusion or compounding in a single- or twin-screw extruder, in a co-kneader or by any continuous or noncontinuous technique, as, for example, with the aid of an internal mixer.

Besides the constituents listed above, compositions according to the invention contain one or a number of matting agents which are, for the most part, in the form of needles or flakes of average length between 1 and 200 $\mu$m and preferably between 50 and 120 $\mu$m and preferably close to 100 $\mu$m and with an aspect ratio, i.e. length/diameter ratio, of between 10 and 40.

The matting agents according to the invention may be inorganic or organic substances.

Among the matting agents of the invention there may be mentioned "whiskers", which are substantially monocrystalline substances, and especially inorganic whiskers of silicon carbide or of titanium nitride, provided that their special morphology is not destroyed, on the one hand when they are incorporated into the coating composition and, on the other hand, when the composition is being used to produce film.

The Applicant Company has discovered another category of matting agents which is particularly efficacious: these are substances whose morphology is modified during the stages of incorporation into the composition and/or the final forming of the composition, so that they are predominantly present within the coating in the form of needles or flakes of average length of between 1 and 200 μm and preferably between 50 and 120 μm and preferably close to 100 μm and with an aspect ratio, i.e. length/diameter ratio, of between 8 and 25.

Within this category of matting agents very particular mention will be made of terephthalic acid dianilide (TAD) of formula I, and its derivatives.

The TAD derivatives according to the invention are preferably water-insoluble. In fact, in many applications the coatings originating from the compositions according to the invention are in contact with water. These are especially the TADs in which at least one of the hydrogen atoms of the aromatic rings is replaced by an alkyl, hydroxyl or sulphonamide group and/or a halogen atom.

The TAD may be prepared by condensation of aniline and terephthaloyl chloride or by amidation of terephthalic acid or of an ester derived from tere- phthalic acid. TAD powder, once synthesized, is in metastable equilibrium at ambient temperature.

The Applicant Company has found that during a rise in temperature TAD undergoes a change in crystalline state, being converted from grains into needles or flakes with an aspect ratio of between 10 and 40. This transition of solid/solid type takes place between 210 and 270° C. with an exothermic peak at 250° C.

The compositions according to the invention (resin(s)+ matting agent(s)+additive(s)), which are intended for the coating of substrates, are generally in the form of powders whose particle size may be between 5 μm and 1 mm.

A first process for obtaining powder compositions according to the invention consists in dry mixing of the various constituents of the composition. This dry mixing or dry blending does not require any special apparatus and may be performed at ambient temperature, which makes it economical.

The resins generally have a particle size of between 20 and 200 μm. When the matting agent is TAD—or one of its derivatives—its particle size before incorporation into the composition is preferably smaller than 20 μm and advantageously smaller than 5 μm.

A second process for obtaining powder compositions according to the invention consists in kneading all the constituents in the molten state in a kneader of appropriate type. In the case of compositions based on thermoplastic resin(s), the kneading temperature may be between 150 and 300° C. and preferably between 180 and 230° C. In the case of compositions based on heat-curable resin(s), the kneading temperature may be between 80 and 140° C. and preferably between 90 and 120° C. The final product is ground, using conventional techniques, to the desired particle size for the coating. Spraying or precipitation may also be used in the process.

The compositions according to the invention may form a masterbatch or a final product.

The masterbatch, which has the advantage of ensuring a good predispersion of the composition, may subsequently be kneaded or mixed dry with the resin(s) using the abovementioned processes.

A third process for obtaining PA-based powder compositions according to the invention consists in performing a (co)polycondensation of the PA monomers in the presence of the matting agent(s). For this purpose the matting agents are introduced into the autoclave at the same time as the polyamide monomers. The polymerization is performed according to conventional procedures. The operation is generally carried out at a temperature of between 150 and 300° C. and preferably between 190 and 250° C.

Any kind of equipment that is used for the polycondensation of polyamides may be employed. For example, a reactor equipped with stirring at approximately 50 rev/min and capable of withstanding a pressure of 20 bars may be mentioned. The polycondensation time may be between 5 and 15 hours and preferably between 4 and 8 hours. When the polycondensation operations are finished, a mixture is obtained in the form of granulate, which is ground to the desired particle size. It is also possible to use precipitation or spraying in the process.

Another subject of the present invention is the use of the powder compositions such as those defined above for the coating of substrates, especially metallic ones, and the substrates thus coated. Examples of substrates which may be mentioned are metal substrates or those including a metal part, for example made of iron, of ordinary or galvanized steel, of aluminium or aluminium alloy, substrates made of wood, of plastics, of glass, cement, terracotta and, generally, composite materials in which at least one of the components may be chosen from the above list. The metal substrate may be chosen from a wide range of products. It may be articles of ordinary or galvanized steel, or aluminium or aluminium alloy articles. The metal substrate may be of any thickness (for example of the order of one tenth of mm or of the order of some tens of cm).

According to a known technique which does not per se constitute a subject of the invention, the metal substrate, and especially one made of ordinary steel, aluminium or aluminium alloy has been able to undergo one or more of the following surface treatments, this list not constituting a limitation: coarse degreasing, alkaline degreasing, brushing, shot- or sandblasting, fine degreasing, hot rinsing, phosphating degreasing, iron/zinc/tri-cation phosphating, chromating, cold rinsing, chromic rinsing.

By way of examples of metal substrates capable of being coated with a composition according to the invention there may be mentioned: degreased, smooth or shot-blasted steel, phosphated degreased steel, iron- or zinc-phosphated steel, Sendzimir galvanized steel, zinc-electroplated steel, bath-galvanized steel, electrophoresis steel, chromated steel, anodized steel, corundum-sanded steel, degreased aluminium, smooth or shot-blasted aluminium and chromated aluminium.

The resin-based composition according to the invention is therefore applied in powder form onto the substrate. The application of the powder composition may be performed using the application techniques conventionally employed. Grinding of the powders may be performed in equipment which is cooled cryogenically or with a high air input (impeller, hammer, disc mills etc.). The powder particles obtained are selected in suitable equipment to eliminate undesired particle size fractions, for example particles that are too coarse and/or too fine.

Among the techniques for application as a powder there may be mentioned electrostatic spraying, dipping in a fluidized bed, the electrostatic fluidized bed (for example that described in Patents DD 277 395 and DD 251 510), techniques which are preferred for carrying out the coating of the substrates according to the invention.

In electrostatic spraying the powder is introduced into a gun in which it is conveyed by compressed air and enters a nozzle raised to a high voltage, generally between about ten and about a hundred kV. The voltage applied may be positive or negative in polarity. The flow rate of powder in the gun is generally between 10 and 200 g/min and preferably between 50 and 120 g/min. As it passes through the nozzle, the powder is charged electrostatically. The powder particles conveyed by the compressed air are applied onto the metal surface to be coated, the said surface itself being earthed, that is to say connected to a zero electrical potential. The powder particles are held on this surface by their electrostatic charge. These forces are sufficient to enable the powder-treated object to be coated and moved and then heated in an oven to a temperature which causes the powder to melt.

Whatever the polarity of application, electrostatic spraying of polyamide-based compositions according to the invention offers an undoubted advantage, especially because it will be possible to employ existing standard industrial plants which are designed for the electrostatic spraying of powder coatings of only one polarity; in this case the metal substrate undergoes a surface preparation.

In general, a powder of average particle size of between 5 and 100 μm and preferably between 20 and 80 μm may be employed. The coating preferably has a thickness of between 80 and 140 μm.

In the case of the process for dipping in a fluidized bed, the metal substrate to be coated, carefully prepared, for example by undergoing one or more of the surface treatments listed above, is heated in an oven to a temperature which is determined according especially to the nature of the said substrate, its shape, its thickness and the desired coating thickness. Thus heated, the substrate is next immersed in a powder composition according to the invention, which is kept in suspension by a gas circulating in a tank with a porous bottom. The powder melts in contact with the hot surfaces and thus forms a deposit the thickness of which is a function of the temperature of the substrate and of the time for which it is immersed in the powder.

The particle size of the powders used in a fluidized bed may be between 10 and 1000 μm and preferably between 40 and 160 μm. In general the coating thickness may be between 150 and 1000 μm and preferably between 350 and 450 μm.

It would not constitute a departure from the scope of the invention to apply to the degreased substrate an adhesiveness primer in liquid or pulverulent form before applying the powders of the invention.

The present invention also relates to a composite material including a substrate and including a coating formed from the powder compositions of the invention. The invention also relates to the preceding material, the powder layer having been melted to form a matt coating.

WAYS OF IMPLEMENTING THE INVENTION

Synthesis of TAD 93 g of aniline and 106 g of sodium carbonate are dissolved in 4 l of water at ambient temperature lower than 35° C. 101.5 g of terephthaloyl chloride are dissolved separately in 0.25 l of methylene chloride. The 2 solutions are then mixed and stirred vigorously. A white precipitate appears. The mixture is then washed and filtered and the precipitate is dried. A white powder of average particle size of approximately 10 μm is obtained and is broken up by grinding to an average particle size of 5 μm. The melting temperature of the powder (TAD) is 335° C. and its crystal modification temperature is 220° C. The TAD obtained above is employed in the following tests.

In all that follows, the proportions of the various constituents are by weight, unless stated otherwise, PA-11 denotes a polyamide 11 of molecular mass Mn before application which is between 9000 and 15,000, of particle size smaller than 100 μm and of average diameter of approximately 30 μm for electrostatic application and of particle size smaller than 400 μm and of average diameter of approximately 100 μm for dipping application, TAD: terephthalic acid dianilide dry-blend mixing: mixing by dry dispersion of pulverulent materials in a fast disperser of the Henschel® type, extrusion mixing: mixing in the molten state with the aid of an extruder, inherent viscosity: viscosity in solution at 20° C. for 0.5 g of polymer in 50 ml of meta-cresol; the inherent viscosity of the PA-11s for electrostatic application is between 0.8 and 1.0; the inherent viscosity of the PA-11s for dipping is between 0.9 and 1.1, %: proportion expressed in relation to the base resin or the mixture (resin+additive(s)), mentioned above.

EXAMPLE 1

Dry Mixture Based on Pure or Natural (filler-free and pigment-free) PA-11/Powder for Electrostatic Application A. Coating Composition 1.5 kg of PA-11 powder and 75 g of TAD (5%) are charged into a fast mixer of Henschel® type. The mixture is stirred for 100 s at a speed of 1800 rev/min. The powder obtained is used as it is.

The natural PA-11 contains approximately 2 mass % of spreading additives and of antioxidant and 3% of autoapplicability agent described in Patent EP 412,888 (epoxy/sulphonamide resin).

B. Application

The powder obtained above is deposited at ambient temperature by electrostatic spraying onto a steel plate which has previously been subjected to degreasing followed by a mechanical surface treatment (shot-blasting). The powder-coated plate then enters an oven which is ventilated with air at a velocity of between 1 and 5 m/s and maintained at 220° C., where it stays for 10 min and is then removed from the oven and cooled freely in air.

C. Evaluation

The specular gloss of the film thus obtained, with a thickness of between 80 and 150 μm, is measured with the aid of a glossmeter at an angle of 60°.

Table 1 shows the gloss measurements of a film obtained from the composition described in Example 1.A and of a film obtained from an identical formulation without TAD.

TABLE 1

|  | Powder without TAD | Powder Ex. 1 |
|---|---|---|
| 60° gloss | 44.5% | 7.2% |
| Standard deviation | 2.2 | 0.3 |

EXAMPLE 2

Mixture Using Extrusion Based on Pure PA-11/ Powder for Electrostatic Application A. Coating Composition A premix of natural PA-11, antioxidant, spreading agent and TAD in a concentration of 6% is produced in a disperser of the Henschel® type. The homogenized combination is then introduced into an extruder at a setpoint temperature of between 190 and 220° C. and with a stock residence time of the order of 30 s. On leaving the extruder, the product thus obtained is cooled and then ground so as to obtain a powder of particle size smaller than 100 μm and of average diameter of 30 μm. To this powder is added, as dry blend, 3% of auto-applicability agent described in Patent EP 412,888 (epoxy/sulphonamide resin).

B. Application

The powder obtained in 2A is deposited by electrostatic spraying onto a steel plate under the same conditions as those described in 1B.

C. Evaluation

The specular gloss of the film thus obtained, of thickness between 80 and 150 μm, is measured with the aid of a glossmeter at an angle of 60°.

Table 2 shows the gloss measurements of a film obtained from the composition described in 2.A and of a film obtained from an identical formulation without the TAD additive.

TABLE 2

| % of TAD | Powder without TAD | Powder Ex. 2 A |
| --- | --- | --- |
| 60° gloss | 70.5% | 20.2% |
| Standard deviation | 2.2 | 0.3 |

EXAMPLE 3

Dry Mixtures Based on Black PA-11/Powders for Electrostatic Application

A. Coating Composition

A premix consisting of 910 parts by weight of natural PA-11, 90 parts by weight of inorganic filler based on silica and calcium carbonate, 5 parts by weight of carbon black and 12 parts by weight of antioxidant is produced in a disperser of the Henschel® type. The homogenized composition is then introduced into an extruder at a set-point temperature of between 190 and 220° C. and with a stock residence time of the order of 30 s. On leaving the extruder, the product thus obtained is cooled and then ground to get to a powder of particle size smaller than 100 μm and of average diameter of 30 μm (black PA-11).

1.5 kg of black PA-11 powder described above, 3% of autoapplicability agent described in Patent EP 412,888 (epoxy resin/sulphonamide) and a number of concentrations of TAD are charged into a fast mixer of the Henschel® type. The mixtures are stirred for 100 s at a speed of 1800 rev/min.

B. Application

The powders obtained in 3.A are deposited onto a steel plate by electrostatic spraying in the same conditions as those described in 1.B.

C. Evaluation

The specular gloss of the films thus obtained, of thickness between 80 and 150 μm, is measured with the aid of a glossmeter at an angle of 60°.

Table 3 shows the gloss measurements of the films obtained from the compositions described in Example 3.A and of a film obtained from an identical formulation.

TABLE 3

|  | 0 | 4 | 5 | 6 |
| --- | --- | --- | --- | --- |
| 60° gloss | 73.5% | 43.6% | 25.2% | 17.1% |
| Standard deviation | 0.5 | 0.7 | 0.8 | 0.3 |

EXAMPLE 4

Mixture Using Extrusion Based on Black PA-11/ Powder for Electrostatic Application A. Coating Composition A premix consisting of 910 parts by weight of natural PA-11, 90 parts by weight of inorganic filler based on silica and calcium carbonate, 5 parts by weight of carbon black, 12 parts by weight of antioxidant and spreading agent and 60 parts by weight of TAD is produced in a disperser of the Henschel® type. The homogenized combination is then introduced into an extruder at a setpoint temperature of between 190 and 220° C. and with a stock residence time of the order of 30 seconds. On leaving the extruder, the product thus obtained is cooled and then ground to get to a powder of particle size smaller than 100 μm and of average diameter of 30 μm (black PA-11 4).

This powder also contains 3% of autoapplic ability agent described in Patent EP 412,888 (epoxy/sulphonamide resin).

B. Application

The powder obtained in 4.A is deposited onto a steel plate by electrostatic spraying in the same conditions as those described in 1.B.

C. Evaluation

The specular gloss of the film thus obtained, of thickness between 80 and 150 μm, is measured with the aid of a glossmeter at an angle of 60°.

Table 4 shows the gloss measurements of a film obtained from the composition described in 4.A and of a film obtained from an identical formulation without the TAD additive.

TABLE 4

|  | Powder without TAD | Black PA-11 4 |
| --- | --- | --- |
| 60° gloss | 71.1% | 1.5% |
| Standard deviation | 0.6 | 0.1 |

EXAMPLE 5

Dry Mixture Based on Black PA-11/Powders for Electrostatic Application

A. Coating Composition

A premix consisting of 58% by weight of natural PA-11, 39.5% of inorganic filler based on calcium carbonate, 0.5% of carbon black and 2% of antioxidant and spreading agent is produced in a disperser of the Henschel® type. The homogenized combination is then introduced into an extruder at a set-point temperature of between 190 and 220° C. and with a stock residence time of the order of 30 s. On leaving the extruder, the product thus obtained is cooled and then ground to get to a powder of particle size smaller than 100 μm and of average diameter of 30 μm (black PA-11 5).

The black PA-11 5 powder and a number of concentrations of TAD are charged into a fast mixer of the Henschel® type. The mixtures are mixed for 100 s at a speed of 1800 rev/min. These powders contain 3% of autoapplicability agent described in Patent EP 412,888 (epoxy/sulphonamide resin).

B. Application

The powders obtained in 5.A are deposited onto a steel plate by electrostatic spraying in the same conditions as those described in 1.B.

C. Evaluation

The specular gloss of the films thus obtained, of thickness between 80 and 150 μm, is measured with the aid of a glossmeter at an angle of 60°.

Table 5 shows the gloss measurements of the films obtained from the described compositions of Example 5.A and of a film obtained from an identical formulation without TAD.

TABLE 5

| % of TAD | 0 | 4 | 5 | 6 |
|---|---|---|---|---|
| 60° gloss | 40.2% | 15.6% | 8.8% | 5.1% |
| Standard deviation | 0.6 | 0.4 | 0.2 | 0.1 |

EXAMPLE 6

Dry Mixtures Based on Black PA-11/Powders for Electrostatic Application

A. Coating Composition

A premix consisting of 78% by weight of natural PA-11, 19.5% of inorganic filler based on calcium carbonate, 0.5% of carbon black and 2% of antioxidant and spreading agent is produced in a disperser of the Henschel® type. The homogenized combination is then introduced into an extruder at a set-point temperature of between 190 and 220° C. and with a stock residence time of the order of 30 s. On leaving the extruder, the product thus obtained is cooled and then ground to get to a powder of particle size smaller than 100 μm and of average diameter of 30 μm (black PA-11 6).

The black PA-11 6 and a number of concentrations of TAD are charged into a fast mixer of the Henschel® type. The mixtures are stirred for 100 s at a speed of 1800 rev/min. These powders contain 3% of autoapplicablility agent described in Patent EP 412,888 (epoxy/sulphonamide resin).

B. Application

The powders obtained in 6.A are deposited onto a steel plate by electrostatic spraying in the same conditions as those described in 1.B.

C. Evaluation

The specular gloss of the films thus obtained, of thickness between 80 and 150 μm, is measured with the aid of a gloss meter at an angle of 60°.

Table 6 shows the gloss measurements of the films obtained from the described compositions of Example 6.A and of a film obtained from an identical formulation.

TABLE 6

| % of TAD | 0 | 3 | 3.5 | 6 |
|---|---|---|---|---|
| 60° gloss | 58.3% | 31.8% | 25.3% | 12.2% |
| Standard deviation | 1.0 | 0.6 | 0.5 | 0.2 |

EXAMPLE 7

Dry Mixtures Based on Grey PA-11/Powders for Electrostatic Application

A. Coating Composition

A premix consisting of 87% by weight of natural PA-11, 9.7% of white pigment, 1.8% of carbon black and of cobalt-based blue pigment and 1.5% of antioxidant and spreading agent is produced in a disperser of the Henschel type. The homogenized combination is then introduced into an extruder at a set-point temperature of between 190 and 220° C. and with a stock residence time of the order of 30 s. On leaving the extruder, the product thus obtained is cooled and then ground to get to a powder of particle size smaller than 100 μm and of average diameter of 30 μm (grey PA-11 7).

The grey PA-11 7 and 5% of TAD are charged into a fast mixer of the Henschel® type. The mixture is stirred for 100 s at a speed of 1800 rev/min.

This powder also contains 3% of autoapplic ability agent described in Patent EP 412,888 (epoxy/sulphonamide resin).

B. Application

The powder obtained in 7.A is deposited onto a steel plate by electrostatic spraying in the same conditions as those described in 1.B.

C. Evaluation

The specular gloss of the film thus obtained, of thickness between 80 and 150 μm, is measured with the aid of a glossmeter at an angle of 60°.

Table 7 shows the gloss measurements of a film obtained from the composition described in 7.A and of a film obtained from an identical formulation without the TAD additive.

TABLE 7

|  | Powder without TAD | Powder Ex. 7.A |
|---|---|---|
| 60° gloss | 80.3% | 5.2% |
| Standard deviation | 2.0 | 0.2 |

EXAMPLE 8

Dry Mixtures Based on White PA-11/Powders for Electrostatic Application

A. Coating Composition

A premix consisting of 69% of natural PA-11, 29.2% of white pigment and 1.8% of antioxidant and spreading agent is produced in a disperser of the Henschel® type. The homogenized combination is then introduced into an extruder at a set-point temperature of between 190 and 220° C. and with a stock residence time of the order of 30 s. On leaving the extruder, the product thus obtained is cooled and then ground to a particle size smaller than 100 μm and of average diameter of 30 μm (white PA-11 8).

The white PA-11 8 described above and a number of combinations of TAD are charged into a fast mixer of the Henschel® type. The mixtures are stirred for 100 s at a speed of 1800 rev/min.

The powder contains 3% of autoapplicability agent described in Patent EP 412,888 (epoxy/sulphonamide resin).

B. Application

The powders obtained in 8.A are deposited on a steel plate by electrostatic spraying in the same conditions as those described in 1.B.

C. Evaluation

The specular gloss of the films thus obtained, of thickness between 80 and 150 μm, is measured with the aid of a glossmeter at an angle of 60°.

Table 8 shows the gloss measurements of the films obtained from the described compositions of Example 8.A and of a film obtained from an identical formulation without TAD.

TABLE 8

| % of TAD | 0 | 3 | 3.5 | 4 |
|---|---|---|---|---|
| 60° gloss | 50.3% | 22.2% | 13.2% | 7.0% |
| Standard deviation | 1.8 | 0.9 | 0.5 | 0.1 |

EXAMPLE 9

Mixtures Using Extrusion Based on White PA-11/ Powders for Electrostatic Application A. Coating Compositions 2 premixes consisting of 69% of natural PA-11, 29.2% of white pigment, 1.8% of antioxidant and spreading agent and, respectively, 2.9% and 5.7% of TAD, relative to this mixture, are produced in a disperser of the Henschel® type. Once homogenized, they are introduced into an extruder at a set-point temperature of between 190 and 220° C. and with a stock residence time of the order of 30 s. On leaving the extruder, the products obtained are cooled and then ground to get to a powder of particle size smaller than 100 μm and of average diameter of 30 μm. These powders contain 3% of autoapplicability agent described in Patent EP 412,888 (epoxy/sulphonamide resin).

B. Application

The powders obtained in 9.A are deposited on a steel plate by electrostatic spraying in the same conditions as those described in 1.B.

C. Evaluation

The specular gloss of the films thus obtained, of thickness between 80 and 150 μm, is measured with the aid of a glossmeter at an angle of 60°.

Table 9 shows the gloss measurements of the films obtained from the described compositions of Example 9.A and of a film obtained from an identical formulation without TAD.

TABLE 9

| % of TAD | 0 | 2.9 | 5.7 |
|---|---|---|---|
| 60° gloss | 50.3% | 24.1% | 17.6% |
| Standard deviation | 1.8 | 1.1 | 1.2 |

EXAMPLE 10

Mixtures Using Extrusion Based on Black PA-11/ Powders for Fluidized Bed Dipping Application A. Coating Composition 2 premixes consisting of 910 parts by weight of natural PA-11, 90 parts by weight of inorganic filler based on silica and calcium carbonate, 5 parts by weight of carbon black, 12 parts by weight of antioxidant and spreading agent and, respectively, 60 and 100 parts by weight of TAD are produced in a disperser of the Henschel® type. Once homogenized, they are extruded in the conditions indicated in 9.A. On leaving the extruder, the products obtained are cooled and then ground to get to a powder of particle size smaller than 400 μm and of average diameter of 100 μm.

B. Application

The powders thus prepared are placed in a fluidization tank consisting of a porous bottom through which is distributed the feed air ensuring the air/powder mixing. The metal substrates to be coated consist of steel plates which have previously undergone degreasing followed by a mechanical surface treatment (shot-blasting). These plates are placed in an oven ventilated with air at a velocity of between 3 and 6 m/s at a temperature of 330° C. for a period which is a function of the thickness of the steel constituting the plates to be coated.

On leaving the oven, the plates are immersed in the fluidized powder for 2 to 15 s so that the thickness of the deposited film is between 250 and 500 μm.

C. Evaluation

The specular gloss of the films thus obtained, of thickness between 250 and 500 μm, is measured with the aid of a glossmeter at an angle of 600.

Table 10 shows the gloss measurements of the films obtained from the described compositions of Example 10.A and of a film obtained from an identical formulation without TAD.

TABLE 10

| % of TAD | 0 | 5.6 | 8.9 |
|---|---|---|---|
| 60° gloss | 63.1% | 14.3% | 8.7% |
| Standard deviation | 0.5 | 0.2 | 0.1 |

EXAMPLE 11

Dry Mixtures Based on Black PA-11/Powders for Fluidized Bed Dipping Application

A. Coating Composition

A premix consisting of 98.5% of natural PA-11, 0.5% of carbon black and 1% of antioxidant and spreading agent is produced in a disperser of the Henschel® type. The homogenized combination is then introduced into an extruder at a set-point temperature of between 190 and 220° C. and with a stock residence time of the order of 30 s. On leaving the extruder, the product thus obtained is cooled and then ground to get to a powder of particle size smaller than 400 μm and of average diameter of 100 μm (black PA-11 11).

The black PA-11 11 described above is charged with, respectively, 2, 3 and 4% of TAD. into a fast mixer of the Henschel® type. The mixtures are stirred for 100 s at a speed of 900 rev/min.

B. Application

Steel plates are coated with the aid of the powders prepared in 11.A in the conditions described in 10.B.

C. Evaluation

The specular gloss of the films thus obtained, of thickness between 250 and 500 μm, is measured with the aid of the glossmeter at an angle of 60°.

Table 11 shows the gloss measurements of the films obtained from the compositions described in 11.A and of a film obtained from an identical formulation without TAD.

TABLE 11

| % of TAD | 0 | 2 | 3 | 4 |
|---|---|---|---|---|
| 60° gloss | 64.3% | 56.8% | 9.2% | 4.0% |
| Standard deviation | 1.8 | 2.0 | 0.2 | 0.1 |

EXAMPLE 12

Dry Mixture Based on Black PA-11/Powder for Fluidized Bed Dipping Application

A. Coating Composition 1 kg of natural PA-11 powder, 6 g of carbon black and 30 g of TAD are charged into a fast mixer of the Henschel® type. The mixture is stirred for 100 s at a speed of 900 rev/min. The powder obtained is used as it is. The natural PA-11 contains approximately 1% of spreading additives and of antioxidant.

B. Application

A steel plate is coated with the aid of the powder prepared in 12.A in the conditions described in 10.B.

C. Evaluation

The specular gloss of the film thus obtained, of thickness between 250 and 500 µm, is measured with the aid of a glossmeter at an angle of 60°.

Table 12 shows the gloss measurements of the film obtained from the composition described in 12.A and of a film obtained from an identical formulation without TAD.

TABLE 12

| % of TAD | 0 | 30 |
|---|---|---|
| 60° gloss | 34.8% | 9.3% |
| Standard deviation | 1.1 | 0.3 |

EXAMPLE 13

Dry Mixtures Based on Grey PA-11/Powders for Fluidized Bed Dipping Application

A. Coating Composition

A premix consisting of 87.3% of natural PA11, 9.7% of white pigment, 1.8% of carbon black and of cobalt-based blue pigment and of 1.2% of antioxidant and spreading agent is dispersed, homogenized, extruded and then ground in the conditions indicated in 11.A (grey PA11 13).

1 kg of grey PA11 13 and, respectively, 2.5 and 3% of TAD are charged into a fast mixer of the Henschel® type. The mixtures are stirred for 100 s at a speed of 900 rev/min.

B. Application

Steel plates are coated with the aid of the powders prepared in 11.A in the conditions described in 10.B.

C. Evaluation

The specular gloss of the films thus obtained, of thickness between 250 and 500 µm, is measured with the aid of a glossmeter at an angle of 60°.

Table 13 shows the gloss measurements of the films obtained from the compositions described in 13.A and of a film obtained from an identical formulation without TAD.

TABLE 13

| % of TAD | 0 | 2.5 | 3 |
|---|---|---|---|
| 60° gloss | 79.4% | 36.7% | 15.5% |
| Standard deviation | 2.1 | 1.4 | 0.8 |

EXAMPLE 14

Mixtures Using Extrusion Based on White PA-11/ Powders for Fluidized Bed Dipping Application A. Coating Composition 2 premixes consisting of 69% of natural PA-11, 29% of white pigment, 2% of antioxidant and spreading agent and, respectively, 2.9% and 5.6% by weight of TAD in relation to the mixture of the preceding constituents are produced in a disperser of the Henschel® type. Once homogenized, each of the mixtures is introduced into an extruder at a set-point temperature of between 190 and 220° C. and with a stock residence time of the order of 30 s. On leaving the extruder, the products thus obtained are cooled and then ground to obtain a powder of particle size smaller than 400 µm and of average diameter of 100 µm.

B. Application

Steel plates are coated with the aid of the powders prepared in 11.A in the conditions described in 10.B.

C. Evaluation

The specular gloss of the films thus obtained, of thickness between 250 and 500 µm, is measured with the aid of a glossmeter at an angle of 60°.

Table 14 shows the gloss measurements of the films obtained from the compositions described in 14.A and of a film obtained from an identical formulation without TAD.

TABLE 14

| % of TAD | 0 | 2.9 | 3.6 |
|---|---|---|---|
| 60° gloss | 39.6% | 17.3% | 5.3% |
| Standard deviation | 0.9 | 0.1 | 0.1 |

EXAMPLE 15

Dry Mixture Based on White PA-12/Powder for Fluidized Bed Dipping Application

A. Coating Composition

A PA-12 formulated with 0.7% by weight of antioxidant and containing 6.4% of fillers (consisting of 84% by weight of titanium dioxide, 2% of silica, 6% of phosphorus and 8% of aluminium) of particle size smaller than 500 µm, of average diameter close to 100 µm and of inherent viscosity of 1.01, sold under the trade name Vestosint® Weiss K 1011, from the company Hüls, is placed in a disperser of the Henschel® type. 2.5% of TAD is added. The whole is homogenized for 100 s with a dispersion speed of 900 rev/min.

B. Application

A steel plate is coated with the aid of the powder prepared in 15.A in the conditions described in 10.B.

C. Evaluation

The specular gloss of the film thus obtained, of thickness between 250 and 500 µm, is measured with the aid of a glossmeter at an angle of 60°.

Table 15 shows the gloss measurements of the film obtained from the composition described in 15.A and of a film obtained from an identical formulation without TAD.

TABLE 15

| % of TAD | 0 | 2.5 |
|---|---|---|
| 60° gloss | 19.9% | 9.4% |
| Standard deviation | 1.0 | 0.5 |

EXAMPLE 16

Dry Mixture Based on Grey PA-12/Powder for Fluidized Bed Dipping Application

A. Coating Composition 1 kg of grey PA-12 powder sold under the trade name Vestosint® Nylon 12 Huels ESF $G^{rau}$ 9.7195 and 5% of TAD are charged into a fast mixer of Henschel® type. THe mixture is stirred for 100 s at a speed of 1800 rev/min.

B. Application

A steel plate is coated with the aid of the powder prepared in 16.A in the conditions described in 10.B.

C. Evaluation

The specular gloss of the film thus obtained, of thickness between 250 and 500 µm, is measured with the aid of a glossmeter at an angle of 60°.

Table 16 shows the gloss measurements of the film obtained from the composition described in 16.A and of a film obtained from an identical formulation without TAD.

TABLE 16

| % of TAD | 0 | 5 |
| --- | --- | --- |
| 60° gloss | 20.2% | 9.9% |
| Standard deviation | 0.3 | 0.2 |

EXAMPLE 17

Dry Mixture Based on Ethylene/Acrylic Acid Copolymer/Powder for Fluidized Bed Dipping Application A. Coating Composition A black powder consisting of a thermoplastic polymer based on ethylene/acrylic acid copolymer and with a melting point of 96° C., marketed under the reference Plastcoat® PPA 571 is placed in a Henschel® disperser as a mixture with 1% of TAD. The whole is homogenized for 100 s with a dispersion speed of 900 rev/min.

B. Application

The powder thus prepared is placed in a fluidization tank consisting of a porous bottom through which is distributed feed air ensuring the air/powder mixing. The metal substrates consist of steel plates which have previously undergone degreasing followed by a mechanical surface treatment (shot-blasting). These plates are placed in an oven ventilated with air at a velocity of between 3 and 6 metres per second at a temperature of 300° C. for a period which can be adapted as a function of the thickness of the steel constituting the plates to be coated.

On leaving the oven, the plates are immersed in the fluidized powder for a period of between 2 and 15 s so as to reach a deposited film thickness of between 250 and 500 μm.

C. Evaluation

The specular gloss of the films thus obtained, of thickness between 250 and 500 μm, is measured with the aid of a glossmeter at an angle of 60°.

Table 17 shows the gloss measurements of the films obtained from the composition described in 17.A and of a film obtained from an identical formulation without TAD.

TABLE 17

| % of TAD | 0 | 1 |
| --- | --- | --- |
| 60° gloss | 75.2% | 31.8% |
| Standard deviation | 3.1 | 1.3 |

EXAMPLE 18

Dry Mixture Based on Natural Epoxy Resin/ Powder for Electrostatic Application

A. Coating Composition 1 kg of natural epoxy (BADGE) powder of epoxy equivalent weight (EEW) of 895 g and of particle size smaller than 100 μm, with an average diameter of 35 μm, 5% of crosslinking agent consisting of dicyandiamide and 5% of TAD are charged into a fast mixer of Henschel® type. The mixture is stirred for 100 s at a speed of 1800 rev/min.

B. Application

The powder obtained in 18.A is deposited at ambient temperature by electrostatic spraying onto steel plates which have previously been subjected to degreasing followed by a mechanical surface treatment (shot-blasting). The plate thus coated is next put in an oven ventilated with air at a velocity of between 1 and 5 m/s, maintained at 200° C., where it stays for 10 min and is then taken out of the oven and cooled freely in air.

C. Evaluation

The specular gloss of the films thus obtained, of thickness between 40 and 120 μm, is measured with the aid of a glossmeter at an angle of 60°.

Table 18 shows the gloss measurements of the films obtained from the composition described in 18.A and of a film obtained from an identical formulation without TAD.

TABLE 18

| % of TAD | 0 | 5 |
| --- | --- | --- |
| 60° gloss | 89.2% | 39.4% |
| Standard deviation | 4.4 | 0.7 |

EXAMPLE 19

Dry Mixture Based on White Epoxy Resin/Powder for Electrostatic Application

A. Coating Composition

A premix consisting of 1000 parts of natural epoxy (BADGE) resin of epoxy equivalent weight of 750 g (EEW), 45 parts of crosslinking agent based on accelerated dicyandiamide, 350 parts of titanium dioxide, 5 parts of benzoin and 6 parts of spreading agent is produced in a Henschel® disperser.

The homogenized combination is then introduced into an extruder at a set-point temperature of between 90 and 120° C. and with a stock residence time of the order of 40 s. On leaving the extruder, the product thus obtained is cooled and then ground to get to a powder of particle size smaller than 100 μm and of average diameter of 30 μm.

1 kg of the white epoxy powder described above and 5% of TAD are charged into a fast mixer of Henschel® type. The mixture is stirred for 100 s at a speed of 1800 rev/min.

B. Application

The powder obtained in 19.A is deposited at ambient temperature by electrostatic spraying onto steel plates which have previously been subjected to degreasing followed by a mechanical surface treatment (shot-blasting). The plates thus coated are then put in an oven ventilated with air at a velocity of between 1 and 5 m/s, maintained at 200° C., where they stay for 10 min and are then taken out of the oven and cooled freely in air.

C. Evaluation

The specular gloss of the films thus obtained, of thickness between 40 and 120 μm, is measured with the aid of a glossmeter at an angle of 60°.

Table 19 shows the gloss measurements of the films obtained from the composition described in 19.A and of a film obtained from an identical formulation without TAD.

TABLE 19

| % of TAD | 0 | 5 |
| --- | --- | --- |
| 60° gloss | 99.5% | 70.3% |
| Standard deviation | 1.1 | 0.7 |

EXAMPLE 20

Dry Mixture Based on White Epoxy Polyester Hybrid/Powder for Electrostatic Application A. Coating Composition A premix consisting of 600 parts of carboxylic polyester resin with an acid value of 35, such as, for example, Uralac®

P3560 from DSM, 400 parts per thousand of epoxy (BADGE) resin of epoxy equivalent weight of 895 g (EEW), such as Epikote® 1004 from Shell, 350 parts of titanium dioxide, 5 parts of benzoin and 6 parts of spreading agent is produced in a Henschel® disperser.

The homogenized combination is then introduced into an extruder at a set-point temperature of between 90 and 120° C. and with a stock residence time of the order of 40 s. On leaving the extruder, the product thus obtained is cooled and then ground to get to a particle size smaller than 100 μm and of average diameter of 30 μm (white polyester/epoxy 20).

1 kg of white polyester/epoxy 20 and 5% of TAD are charged into a fast mixer of Henschel® type. The mixture is stirred for 100 s at a speed of 1800 revolutions/minute.

B. Application:

The powder obtained in A is deposited at ambient temperature by electrostatic spraying onto steel plates which have previously undergone degreasing followed by a mechanical surface treatment (shot-blasting). The coated plates are then placed in an oven ventilated with air at a velocity of between 1 and 5 m/s, maintained at 200° C., where they stay for 10 min and are then taken out of the oven and cooled freely in air.

C. Evaluation:

The films thus obtained, of thickness between 40 and 120 μm, are analysed with a glossmeter at an angle of 60°.

Table 20 shows the gloss measurements of a film obtained from the formulations of Example 20.A and of a film obtained from an identical formulation without TAD.

TABLE 20

|  | Powder without TAD | Powder Ex. 20 |
|---|---|---|
| 60° gloss | 93.8% | 40.9% |
| Standard deviation | 1.1 | 0.3 |

EXAMPLE 21

Dry Mixture Based on White TGIC Polyester/ Powder for Electrostatic Application

A. Coating Composition

A premix consisting of 1000 parts of carboxylic polyester resin with an acid value of 35, 67 parts of triglycidyl isocyanurate (TGIC) crosslinking agent, 350 parts of titanium dioxide, 5 parts of benzoin and 6 parts of spreading agent is produced in a Henschel®.

The homogenized combination is then introduced into an extruder at a set-point temperature of between 90 and 120° C. and with a stock residence time of the order of 40 s. On leaving the extruder, the product thus obtained is cooled and then ground to get to a powder of particle size smaller than 100 μm and of average diameter of 30 μm (white polyester/ TGIC 21).

1 kg of white polyester/TGIC 21 and 5% of TAD are charged into a mixer of Henschel® type. The mixture is stirred for 100 s at a speed of 1800 revolutions/min.

B. Application

The powder obtained in A is deposited at ambient temperature by electrostatic spraying onto steel plates in conditions which are identical with those described in 20.B.

C. Evaluation

The films thus obtained, of thickness between 40 and 120 μm, are analysed with a glossmeter at an angle of 60°.

Table 21 shows the gloss measurements of a film obtained from the formulations of Example 21.A and of a film obtained from an identical formulation without TAD.

TABLE 21

|  | Powder without TAD | Powder Ex. 21 |
|---|---|---|
| 60° gloss | 96.5% | 45.9% |
| Standard deviation | 1.5 | 0.8 |

EXAMPLE 22

Dry Mixture Based on White TGIC Polyester/ Powder for Electrostatic Application

A. Coating Composition 1 kg of polyester/TGIC powder marketed by the Courtaulds company under reference Interpon® D 525 Satin white and 5% of TAD are charged into a fast mixer of Henschel® type. The mixture is stirred for 100 s at a speed of 1800 rev/min.

B. Application

The powder obtained in A is deposited at ambient temperature by electrostatic spraying onto steel plates in conditions which are identical with those described in 20.B.

C. Evaluation

The films thus obtained, of thickness between 40 and 120 μm, are analysed with a glossmeter at an angle of 60°.

Table 22 shows the gloss measurements of a film obtained from the formulations of Example 22.A and of a film obtained from an identical formulation without TAD.

TABLE 22

|  | Powder without TAD | Powder Ex. 22 |
|---|---|---|
| 60° gloss | 47.8% | 27.5% |
| Standard deviation | 0.6 | 0.4 |

EXAMPLE 23

Dry Mixture Based on Natural TGIC Polyester/ Powder for Electrostatic Application A. Coating Composition 1 kg of polyester/TGIC powder marketed by the company Akzo Nobel under reference Varnish 23 P34NF and 5.0% of TAD are charged into a fast mixer of Henschel® type. The mixture is stirred for 100 s at a speed of 1800 rev/min.

The powder obtained in A is deposited at ambient temperature by electrostatic spraying onto steel plates in conditions which are identical with those described in 20.B.

C. Evaluation:

The films thus obtained, of thickness between 40 and 120 μm, are analysed with a glossmeter at an angle of 60°.

Table 23 shows the gloss measurements of a film obtained from the formulations of Example 23.A and of a film obtained from an identical formulation without TAD.

TABLE 23

|  | Powder without TAD | Powder Ex. 23 |
|---|---|---|
| 60° gloss | 100.9% | 47.9% |
| Standard deviation | 0.4 | 0.4 |

EXAMPLE 24

Extrusion Mixture Based on White TGIC Polyester/ Powder for Electrostatic Application A. Coating Composition A premix consisting of 1000 parts of carboxylic polyester resin with an acid value of 35, 67 parts of 1,3,5-triglycidyl isocyanurate (TGIC), 350 parts of titanium dioxide, 60 parts of TAD, 5 parts of benzoin and 6 parts of spreading agent is produced in a Henschel®.

The homogenized combination is then introduced into an extruder at a set-point temperature of between 90 and 120° C. and with a stock residence time of the order of 40 s. On leaving the extruder, the product thus obtained is cooled and then ground to get to a powder of particle size smaller than 100 μm and of average diameter of 30 μm.

B. Application:

The powder obtained in A is deposited at ambient temperature by electrostatic spraying onto steel plates in conditions which are identical with those described in 20.B.

C. Evaluation:

The films thus obtained, of thickness between 40 and 120 μm, are analysed with a glossmeter at an angle of 60°.

Table 24 shows the gloss measurements of a film obtained from the formulations of Example 24.A and of a film obtained from an identical formulation without TAD.

TABLE 24

|  | Powder without TAD | Powder Ex. 24 |
| --- | --- | --- |
| 60° gloss | 96.5% | 15.2% |
| Standard deviation | 1.5 | 0.3 |

EXAMPLE 25

Extrusion Mixture Based on Black PA11/Powders for Electrostatic Application (example comparing the gloss obtained with or without incorporation of inorganic fillers)

A. Coating Composition

A premix consisting of 58% by weight of natural PA-11, 39% of inorganic filler based on calcium carbonate, 0.5% of carbon black and 2% of antioxidant and spreading agent is produced in a disperser of the Henschel® type. The homogenized combination is then introduced into an extruder at a set-point temperature of between 190 and 220° C. and with a stock residence time of the order of 30 s. On leaving the extruder, the product thus obtained is cooled and then ground to get to a powder of particle size smaller than 100 μm and of average diameter of 30 μm (black PA-11 25).

These powders contain 3.0% of autoapplicability agent described in Patent EP 412,888 (epoxy/sulphonamide resin).

B. Application

The powders obtained in 25.A are deposited by electrostatic spraying onto a steel plate in the same conditions as those described in 1.B.

C. Evaluation

The specular gloss of the films thus obtained, of thickness between 80 and 150 μm, is measured with the aid of a glossmeter at an angle of 60°.

Table 25 shows the gloss measurements of films obtained from the described compositions of Example 25.A and of films obtained from identical formulations without the 29% of inorganic fillers based on calcium carbonate and for the films obtained from the powder of Example 4.A (identical formulation but without the fillers and with TAD).

TABLE 25

|  | Powder without inorganic filler | Powder Ex. 25 | Powder Ex. 4 |
| --- | --- | --- | --- |
| 60° gloss | 71.1% | 40.2% | 1.5% |
| Standard deviation | 0.6 | 0.6 | 0.1 |

EXAMPLE 26

Dry Mixtures Based on Black PA11/Powders for Electrostatic Application (use of inorganic whiskers based on silicon carbide)

A. Coating Composition

A premix consisting of 910 parts by weight of natural PA-11, 90 parts by weight of inorganic filler based on silica and calcium carbonate, 5 parts by weight of carbon black and 12 parts by weight of antioxidant is produced in a disperser of the Henschel® type. The homogenized combination is then introduced into an extruder at a set-point temperature of between 190 and 220° C. and a stock residence time of the order of 30 s. On leaving the extruder, the product thus obtained is cooled and then ground to get to a powder of particle size smaller than 100 μm and of average diameter of 30 μm (black PA-11).

1.5 kg of black PA-11 powder described above, 3.0% of autoapplicability agent described in Patent EP 412,888 (epoxy/sulphonamide resin) and 50 parts per thousand of inorganic whiskers based on silicon carbide (SiC) of diameter between 0.7 and 1.2 μm and of aspect ratio of between 10 and 25 are charged into a fast mixer of Henschel® type. The mixture is stirred for 100 s at the speed of 1800 rev/min.

B. Application

The powders obtained in 26.A are deposited by electrostatic spraying onto a steel plate in the same conditions as those described in 1.B.

C. Evaluation

The specular gloss of the films thus obtained, of thickness between 80 and 150 μm, is measured with the aid of a glossmeter at an angle of 60°.

Table 26 shows the gloss measurements of the films thus obtained from the described compositions of Example 26.A and of films obtained from identical formulations without TAD.

TABLE 26

| % of TAD | Powder without whiskers based on SiC | Powder Ex. 26 |
| --- | --- | --- |
| 60° gloss | 73.5% | 32.2% |
| Standard deviation | 0.5 | 0.9 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. Composition for the coating of substrates of matt surface appearance, comprising at least one thermoplastic and/or heat-curable resin selected from the group consisting of polyolefins, polyvinyl chloride (PVC), aliphatic, cycloaliphatic and/or aromatic polyamides polyapide-based thermoplastic elastomers, by themselves, mixed and/or copolymerized,
epoxy and phenolic resins,
epoxy resin esters,
polyester resins,
acrylic and polyurethane resins, and an effective amount of at least one matting agent, the matting agent is substantially in the form of needles or flakes of average length of between 1 and 200 μm and with an aspect ratio of between 10 and 40, wherein the matting agent is selected from terephthalic acid dianilide (TAD) of formula

and its substituted derivatives in which at least one of the hydrogen atoms of the aromatic rings is replaced by an alkyl hydroxyl or sulphonamide group and/or halogen atom.

2. Composition according to claim 1, wherein the matting agent is whiskers.

3. Composition according to claim 1, wherein it contains from 1 to 10% by weight of matting agent(s).

4. Process for the manufacture of the compositions of claim 1 by dry mixing of the various constituents.

5. Process for the manufacture of the compositions of claim 1 by mixing of the various constituents in the molten state, followed by grinding.

6. Coated substrate comprising a film of the composition of claim 1 on the surface of the substrate.

7. Process for the manufacture of the substrate according to claim 6 wherein the film is applied to the substrate by dipping in a fluidized bed of the composition.

8. Process for the manufacture of the substrate according to claim 6 wherein the film is applied to the substrate by electrostatic spraying of the composition thereon.

9. Composite materials of matt surface appearance, comprising a substrate and a surface coating in the form of a film as defined in claim 6.

10. Composite material comprising a metal substrate and a coating formed from a composition of claim 1 containing terephthalic acid dianilide (TAD).

11. Composite materials according to claim 1, wherein the length is between 50 and 120 μm.

12. Composite materials according to claim 11, wherein the length is about 100 μm.

13. Composite materials according to claim 3, wherein the content is from 2 to 6%.

14. Composition according to claim 1, wherein the polyamide is at least one of polyamide-11, polyamide-12, polyamide-12,12, polyamide-6, polyamide-6,6, polyamide-6,12.

15. Composition according to claim 1, wherein the polyolefin is polyethylene (PE), polypropylene (PP), their copolymers or mixtures.

16. The composite material of claim 10 shaped as furniture, decoration or building.

17. Process for the manufacture of the composite material according to claim 10 wherein the coating is applied to the substrate by dipping in a fluidized bed of the composition.

18. Process for the manufacture of the composite material according to claim 10 wherein the coating is applied to the substrate by electrostatic spraying of the composition thereon.

19. The coated substrate of claim 6 shaped as furniture, decoration or building.

* * * * *